United States Patent [19]

Wolfe

[11] Patent Number: 5,715,445
[45] Date of Patent: Feb. 3, 1998

[54] DOCUMENT RETRIEVAL SYSTEM EMPLOYING A PRELOADING PROCEDURE

[76] Inventor: Mark A. Wolfe, 401 S. First St. #1712, Minneapolis, Minn. 55401

[21] Appl. No.: 474,921

[22] Filed: Jun. 7, 1995

Related U.S. Application Data

[63] Continuation of Ser. No. 300,343, Sep. 2, 1994, abandoned.

[51] Int. Cl.$^6$ ................................................ G06F 17/30
[52] U.S. Cl. ......................... 395/605; 395/615; 395/762; 395/776; 395/335
[58] Field of Search ............................ 395/613, 338, 395/605, 788, 335, 344, 345, 159, 161

[56] References Cited

U.S. PATENT DOCUMENTS

| | | | |
|---|---|---|---|
| 4,723,211 | 2/1988 | Barker et al. | 395/759 |
| 4,730,252 | 3/1988 | Bradshaw | 395/202 |
| 4,760,606 | 7/1988 | Lesnick et al. | 382/306 |
| 4,839,853 | 6/1989 | Deerwester et al. | 395/605 |
| 4,931,935 | 6/1990 | Ohira et al. | 395/759 |
| 4,945,476 | 7/1990 | Bodick et al. | 395/759 |
| 4,954,969 | 9/1990 | Tsumura | 395/327 |
| 5,021,989 | 6/1991 | Fujisawa et al. | 395/788 |
| 5,062,074 | 10/1991 | Kleinberger | 395/604 |
| 5,122,951 | 6/1992 | Kamiya | 395/759 |
| 5,123,088 | 6/1992 | Kasahara et al. | 395/788 |
| 5,157,783 | 10/1992 | Anderson et al. | 395/604 |
| 5,206,949 | 4/1993 | Cochran et al. | 395/604 |
| 5,220,648 | 6/1993 | Sato | 395/603 |
| 5,241,671 | 8/1993 | Reed et al. | 395/600 |
| 5,243,149 | 9/1993 | Comerford et al. | 178/18 |
| 5,253,337 | 10/1993 | Hirose | 395/357 |
| 5,255,386 | 10/1993 | Prager | 395/602 |
| 5,257,367 | 10/1993 | Goodlander et al. | 395/602 |
| 5,261,071 | 11/1993 | Lyon | 395/427 |
| 5,265,065 | 11/1993 | Turtle | 395/600 |
| 5,289,569 | 2/1994 | Taniguchi | 395/759 |
| 5,301,109 | 4/1994 | Landauer et al. | 364/759 |
| 5,325,298 | 6/1994 | Gallant | 364/759 |
| 5,341,293 | 8/1994 | Vertelney et al. | 364/419.17 |
| 5,392,387 | 2/1995 | Fitzpatrick et al. | 395/788 |
| 5,404,442 | 4/1995 | Foster et al. | 395/159 |
| 5,408,655 | 4/1995 | Oren et al. | 395/601 |
| 5,418,948 | 5/1995 | Turtle | 395/604 |
| 5,421,008 | 5/1995 | Banning et al. | 395/604 |
| 5,471,575 | 11/1995 | Giasante | 395/788 |
| 5,495,581 | 2/1996 | Tsai | 395/788 |
| 5,544,352 | 8/1996 | Egger | 395/605 |

OTHER PUBLICATIONS

*Discovering Westlaw: The Essential Guide* (4th ed.) (©1995 West Publishing Corporation).

*PatentWorks Workbench User's Guide*, Waverley Systems, Inc., pp. 1–6, 67–95, and Quick Reference Card (©1994 Waverley Systems, Inc.).

*Shepard's United States Citations: CD–ROM User's Manual* (©1994 McGraw–Hill, Inc.).

*How To Shepardize, 1993 Edition* (©1993 McGraw–Hill, Inc.).

*Questions & Answers (To Be Used With "How To Shepardize")* (©1993 McGraw–Hill, Inc.).

".More" product literature (one page) (©1995 Lexis/Nexis).

*Software Products: Prepare to Practice* (pamphlet) (©1995 Lexis/Nexis).

(List continued on next page.)

Primary Examiner—Thomas G. Black
Assistant Examiner—Hosain T. Alam

[57] ABSTRACT

A document retrieval system is disclosed that improves a database system's response time so that a user's request to view new information is serviced quickly. During the time the user spends viewing the displayed information, other information that the user is likely to read or study later is preloaded into memory. If the user does later request this information, this information can be written to the display very quickly because the information need not be retrieved from the database. The present invention takes advantage of the fact that it is possible to accurately predict the information that the user will eventually request. Adaptive prediction schemes can be employed as an aid in determining what information the user will request.

4 Claims, 12 Drawing Sheets

OTHER PUBLICATIONS

*The End of the Beginning* (pamphlet) (©1995 Lexis/Nexis).
*Freestyle Quick Reference* (pamphlet) (©1994 Lexis/Nexis).
Lori Grunin, "Publish Without Paper!," *PC Magazine*, Feb. 7, 1995, pp. 110–171.
Rick Ayre & Kevin Reichard, "The Web Untangled," *PC Magazine*, Feb. 7, 1995, pp. 173–196.
Nick Wingfield, "Web–wise apps," *Info World*, Aug. 28, 1995, pp. 1, 20.
Joel Snyder, "Taming the Internet," *MacWorld*, Dec. 1994, pp. 115–117.
Mark Brownstein, "Fast Drives, Tiny Packages," *PC/Computing*, Nov. 1994, pp. 140–141.

DOCUMENT RETRIEVAL SYSTEM EMPLOYING A PRELOADING PROCEDURE

This is a continuation of application Ser. No. 08/300,343, filed on Sep. 2, 1994, now abandoned.

FIELD OF THE INVENTION

The present invention relates to a system for retrieving information from a database. More specifically, the present invention improves a system's response time so that a user's request to view new information is serviced quickly.

BACKGROUND OF THE INVENTION

The recent proliferation of electronic text and multimedia databases has placed at society's fingertips a wealth of information and knowledge. Typically, a computer is employed that locates and retrieves information from the database in response to a user's input. The requested information is then displayed on the computer's monitor. Modern database systems permit efficient, comprehensive, and convenient access to an infinite variety of documents, publications, periodicals, and newspapers.

Databases come in various forms. Database systems based on remotely-located, multiple-user databases, such as Westlaw, LEXIS/NEXIS, and Dialog, are well known. These systems employ a central computer that services requests and queries from multiple, remotely-located researchers. More recently, local, single-user databases such as those on CD-ROM have become quite popular. In all cases, databases contain far too much information to be stored in a computer's local random access memory. For this reason, the information must be stored in a database external to memory, and the database is accessed only as needed.

Information in the database is normally accessed through a user-generated Boolean query. As is well known in the art, a query comprises one or more search terms and connectors that define the relationship between multiple search terms. For example, a boolean query can be formulated that will find only those documents where the words "Hadley" and "Baxendale" occur in the same sentence. Another query might require that "Hadley" and "Baxendale" be found within a given number of words of each other. Other queries might restrict the search so as to require that all the search documents be published in a certain year, or range of years.

Another querying technique employs the use of a "natural language" processor. The natural language processor interprets a user-formulated query consisting of a list search terms, and then finds the most relevant documents based on a statistical analysis of the uniqueness of the search terms. "Uniqueness" is usually defined by the contents of the database.

Whatever querying technique is used, a search engine uses the query define a class of documents within the database, and locates each of the documents within the class. The user then browses the search results by "paging through" one or more of the search documents.

Although databases are capable of accommodating huge amounts of information, retrieving information from databases is much slower than retrieving information from local random access memory. In multiple-user, remotely-located databases, for example, the user typically retrieves search documents over an ordinary telephone line, which is a very narrow bottleneck. In single-user, local systems, retrieval of search documents requires that the documents be read from a relatively slow local mass storage device (e.g., a CD-ROM drive).

Consequently, today's database systems are plagued by the problem of slow document retrieval. After a query is processed and search documents are identified, the user begins browsing the search results by studying the first view (or screen of information) from one of the search documents. The user then either "pages-down" to the next view within the same document, or moves to another search document. Each of these moves requires that new information be retrieved from the database before it can be displayed on the screen. Since the retrieval time is substantial, as described above, the database system is slow in responding to the user's request for the information.

The result is that while today's electronic database systems are able to efficiently locate within a vast database those search documents that satisfy a query, browsing the search documents is inefficient, slow, and tedious. There exists a compelling need, therefore, for a database system that has a quicker response time so that the database system displays information very soon after the user requests it. Such a system will significantly improve the useability and efficiency of modern database systems.

SUMMARY

This need can be satisfied by effectively utilizing the time the user spends studying the information on the display screen. In a database system (or document retrieval system) in one embodiment of the present invention, information that the user is likely to eventually request is preloaded into memory while the user is viewing other information. The present invention takes advantage of the fact that it is possible to accurately predict the information that the user will eventually request be shown on the display. The present invention also takes advantage of the fact that the time that the user spends viewing displayed information is often sufficient to advantageously preload a substantial amount of information.

When the user does request new information, the requested information is retrieved from memory if the information is in memory. And if the requested information is in memory, the database system can respond to the user's request for new information very quickly.

In one embodiment of the present invention, a method of retrieving information from documents in a database using a computer having a memory unit, a monitor, and an input device carries out the steps of: (1) executing a query on the database to find search documents that satisfy the query; (2) loading a display view into the memory unit from the database, wherein the display view is from one of the search documents; (3) displaying the display view; (4) preloading an anticipated view into the memory unit from the database before the anticipated view is requested through the input device; (5) monitoring the input device for a requested view; and (6) displaying the requested view by retrieving the requested view from the memory unit if the requested view is in the memory unit.

It is an object of the present invention to provide an improved database system.

It is an object of the present invention to provide a database system that quickly responds to a user's request for information.

It is a further object of the present invention to quickly respond to a user's request for a dynamically-related search document.

It is a further object of the present invention to improve CD-ROM database systems.

It is a still further object of the present invention to improve on-line database systems.

With these and other objects, advantages, and features of the invention that may become hereinafter apparent, the nature of the invention may be more clearly understood by reference to the following detailed description of the invention, the appended claims, and to the several drawings herein.

DETAILED DESCRIPTION

Figure 1:
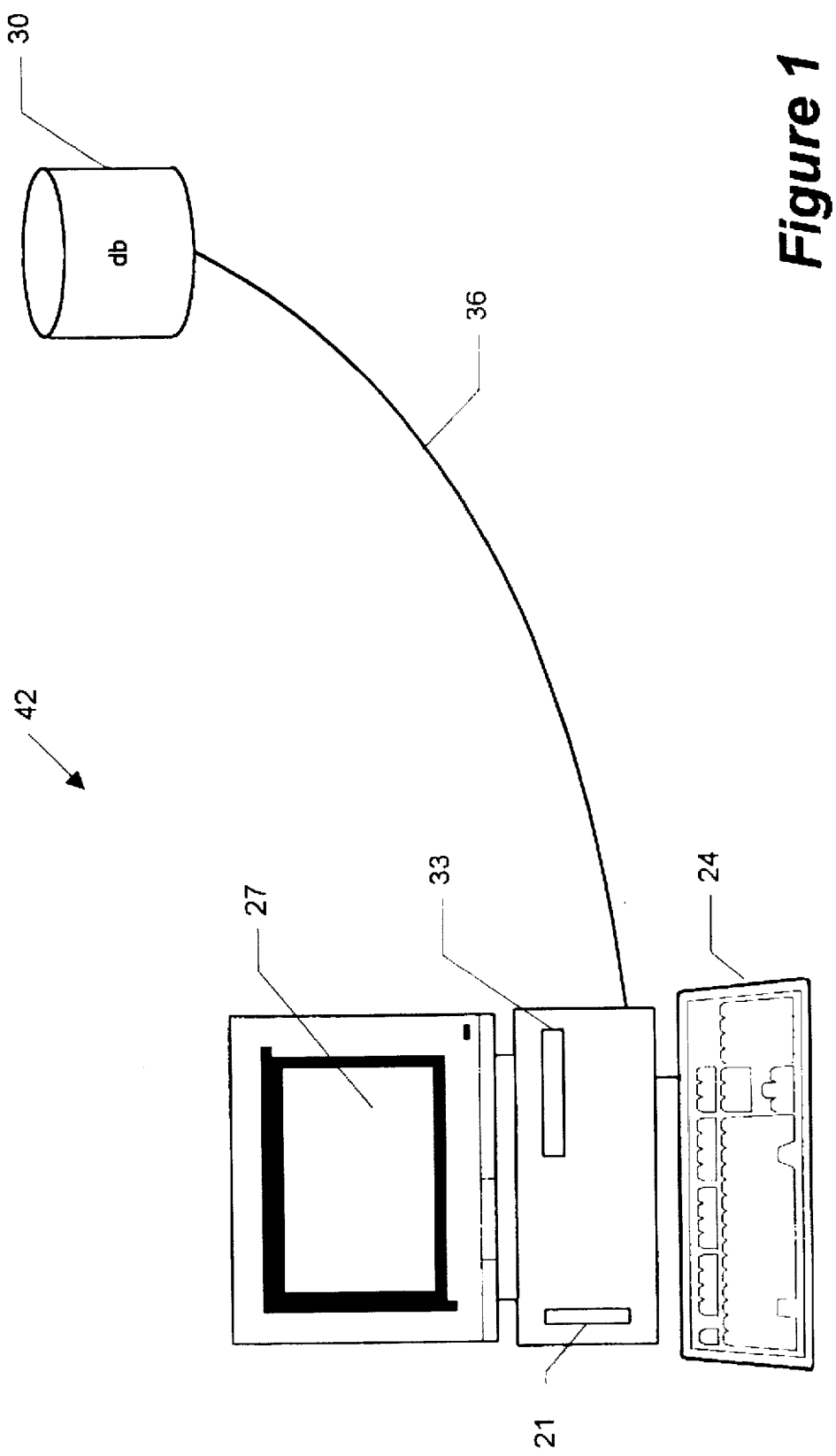
FIG. 1 is a database system in one embodiment of the present invention.

FIG. 1 shows a database system (i.e., document retrieval system) with a computer 42, a database 30, and program logic 33. The computer 42 includes a monitor 27, and input device 24 and memory unit 21. The computer 42 can be any general- or specialized-purpose digital processing machine that operates in accordance with the present invention. The monitor 27 can be any type of display screen or display device.

The memory unit 21 can be one or more high-speed random access memory devices. Typically, this would involve dynamic random access memory, but any type of read/mite memory device is appropriate as long as the access and/or retrieval time is shorter than that of the database 30. It is therefore possible that the memory unit 21 can be a disk drive, if the disk drive has a shorter access time than the database 30. "Memory" is herein defined to mean the same thing as "memory unit," and the two terms are used interchangeably in this specification.

The program logic 33 is typically software (e.g., on magnetic or optical media) that runs on a general purpose computer, but the program logic 33 may also be firmware or hardware.

The database 30 is accessible by the computer 42 over connection 36. The connection 36 is shown as a wire, but obviously other connections can be appropriate. The database 30 can be a "many-user" database, a "multiple-user" database, or a "single-user" database. Many-user databases and multiple-user databases differ from single-user databases in that they allow more than one user to access the database. A many-user database is found in a system where a very large number of users can access the database simultaneously as with on-line databases such as Westlaw, LEXIS/NEXIS, and Dialog. A multiple-user database, on the other hand, permits more than one user to access the database, but the number of simultaneous users is small, perhaps half a dozen or so at any given time. Multiple-user databases might be found in client/server or similar environments. As will be described, the effectiveness of the present invention depends to some extent on the type of database employed.

Finally, the input device 24 can be any type of input device that allows the user to navigate through documents. This can include a keyboard, a voice recognition system, a pen-based input mechanism, a touch-screen, or any other appropriate input means.

Figure 2:
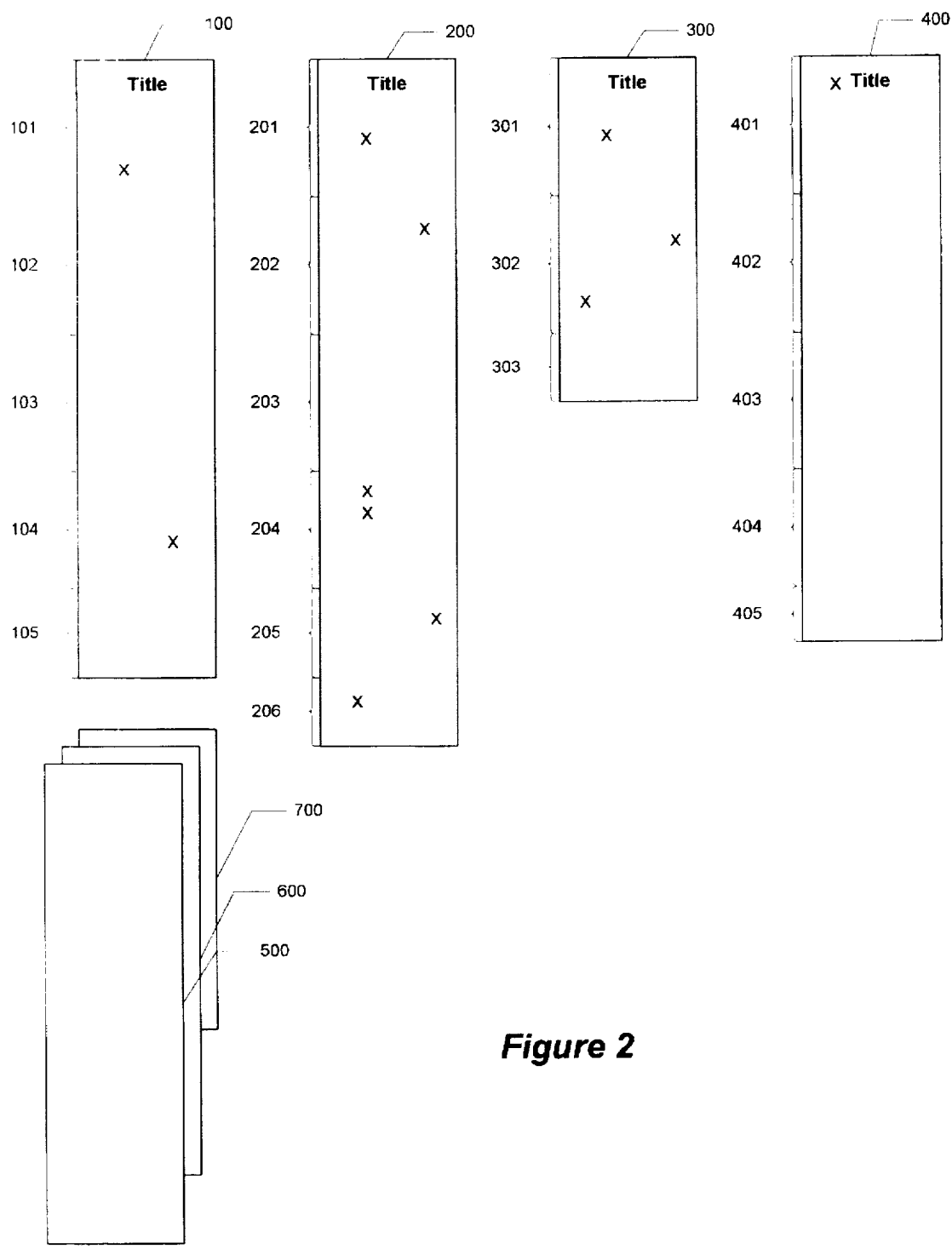
FIG. 2 is a representation of four search documents and three related documents.

FIG. 2 shows a representation of four documents that might correspond to search documents within the database 30 that satisfy a query formulated by the user. In the classic case, and in FIG. 2, a "document" is a textual representation of an article, book, or other literary work. But a "document" need not only be text—it could also be a picture, video clip, or information in another format, such as might be available in a multimedia encyclopedia.

Referring again to FIG. 2, document 100 is five "views" in length. Each "view" corresponds to that amount of information that can be shown on the monitor at any one time. The number of views in a search document therefore depends on the size of the monitor's display. The five views that compose document 100 are shown as views 101, 102, 103, 104, and 105. Document 200 is six views in length (201, 202, 203, 204, 205, and 206). Document 300 is three views in length (301, 302, and 303) and document 400 is five views in length (401, 402, 403, 404, and 405).

The search documents of FIG. 2 might represent the search documents found as a result of a query formulated to find all the documents in the database that include the phrase "Hadley v. Baxendale." Each X in the search documents represents an occurrence of the phrase "Hadley v. Baxendale." As can be seen, the phrase "Hadley v. Baxendale" can be found in search document 1 at two separate locations. Document 2 has six occurrences, and search document 3 has three. Search document 4 has one occurrence—the title of search document 4 is "Hadley v. Baxendale."

There are also "related documents" (500, 600, and 700) shown in FIG. 2. A related document is a document that is somehow explicitly associated, linked, or otherwise connected to one of the search documents. For example, if search document 1 is a judicial opinion, a related document might be a subsequent opinion in the same case (e.g., an decision on appeal). Other related documents might be an opinion or scholarly article that cites or discusses search document 1, or a list of judicial opinions that cite the search document. Any document that is usefully associated with the search document can be considered a related document. Often, the related document does not satisfy the query, so it is usually not one of the search documents. In some circumstances, however, the related document might satisfy the query, so it can be a search document.

Related documents may also be related only to a particular view within a search document. For example, a search document that is a judicial opinion may have numerous other judicial opinions cited in the text of the opinion. These cited opinions may be "related documents," but often they relate only to a particular view within the document. Depending on the implementation of the database system, they might not be considered to be "related" to the search document as a whole. Thus, they are available as related documents only when the corresponding cite is within the currently displayed view. In such an implementation, the related documents are dependent on the view shown on the monitor at any given time.

Figure 3:
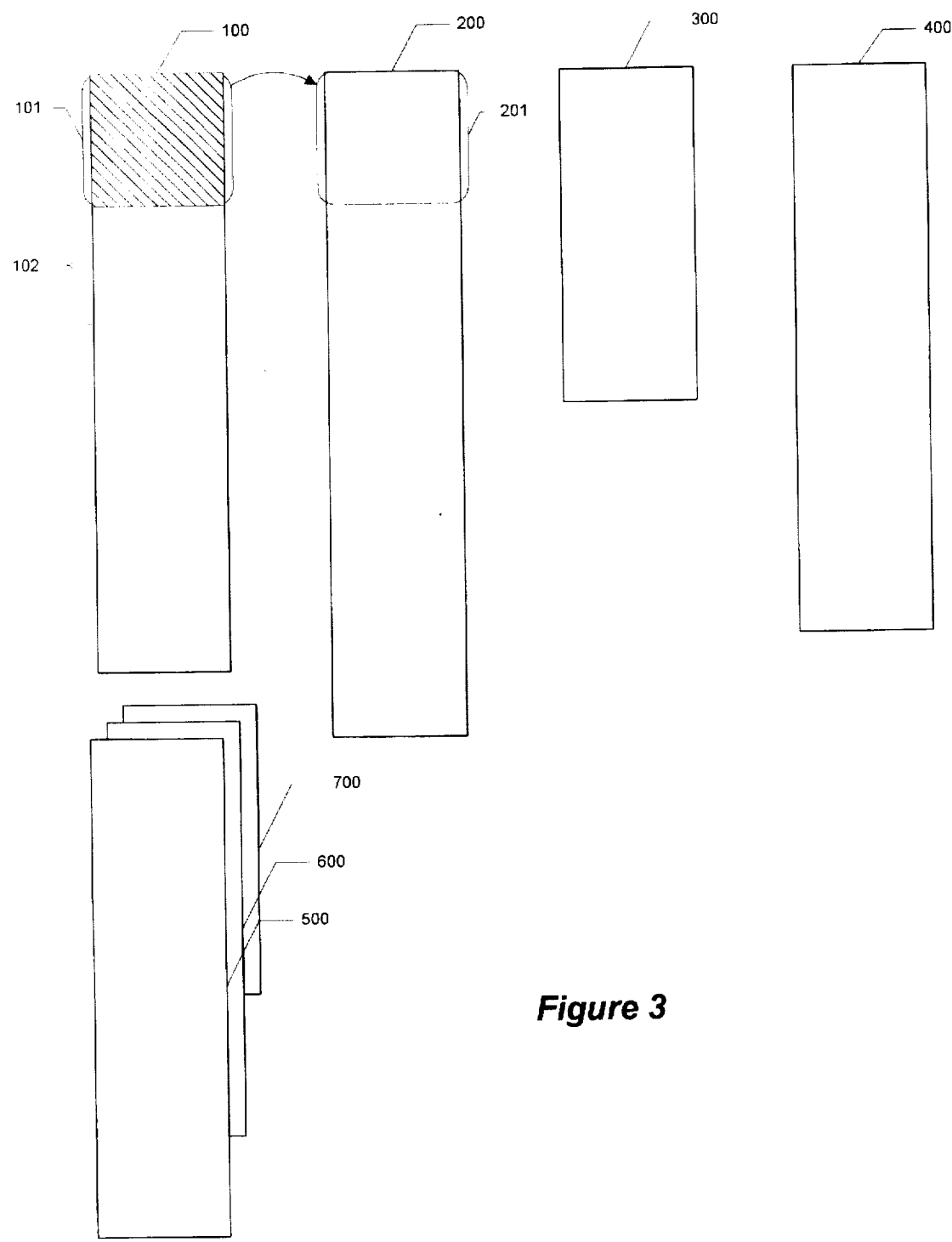
FIG. 3 is a representation of four search documents and three related documents with a display view and one anticipated view.

FIG. 3 shows the representation of the four search documents that satisfy the user's query. The search documents are ordered by an ordering characteristic, such as the date of publication. Other ordering characteristics can be used as appropriate for a given situation (e.g., number of query terms in a document, statistical relevance of the documents, type of document, etc.). Any ordering characteristic that permits the search documents to be distinguished from one another can be appropriate. In the example of FIG. 3, search document 100 is the first search document according to the ordering characteristic, and view 101 (shaded) in search document 100 is the display view shown on the monitor 27. (The view shown on the monitor at any given time is the "display view.") Once view 101 is displayed on the monitor, the user reads, studies or otherwise observes the displayed information. When the user wishes to change the display view, he or she uses the input device 24 to cause the system to display either (a) a different view in the search document 100, or (b) a view from one of the other documents 200, 300, 400, 500, 600, or 700.

The user uses one or more input devices to request particular views. For example, an input device might be a keyboard that includes a "next page" key and a "next document" key. The "next page" key requests the next successive view (view 102) within the document currently being viewed (document 100). The "next document" view requests the first view (view 201) of the next successive search document according to the ordering characteristic (document 200). Many database systems have "next page" and "next document" commands or keys (e.g., Westlaw, LEXIS/NEXIS, and West Publishing Company's CD-ROM products), as well as others (e.g., "previous document," "previous page"). Westlaw also permits a user to request a particular search document or "page" by typing a command. For example, to view search document three (300), the user types "r3"; to request page 2 (i.e., view 2) within the currently displayed document, the user types "p2." And in some systems, multiple commands can be executed together by separating them with a semicolon, so page two from document three (view 302) can be requested with a single command: "r3;p2."

In the systems of the prior art, when the database system receives the command to display a different view, the requested view must be loaded from the database 30 before it can be displayed on the monitor 27. Since retrieving information from the database is time-consuming, this loading process is undesirably slow. But in a system employing the present invention, the time required to respond to the user's request for a different view (the "requested view") is reduced by taking advantage of the fact that it is often possible to predict the requested view before the user actually requests it. In the present invention, the view(s) that the user is likely to next request are preloaded while the user is reading the displayed view.

Thus, in one embodiment of the present invention, the view or views (i.e., anticipated view(s)) that are likely to be next requested by the user are "preloaded" (e.g., in the background) to the extent permitted by the time the user spends reading or studying the display view. When the user does request that a different view be displayed (i.e., the user requests a "requested view"), the requested view can be very quickly displayed on the monitor if it has already been preloaded into memory. Thus, if the requested view is one of the anticipated views, the database system is able to quickly respond to the user's request for the requested view.

As shown in FIG. 3, while the user is reading or studying the display view 101, view 201 is identified as an anticipated view (signified by the arrow from view 101 to view 201). View 201 is likely to be requested by the user because it is the first view of the "next" search document (as defined by the ordering characteristic) following search document 100. And while the display view 101 is being viewed by the user, the database system will preload view 201 from the database into memory, before it is actually requested by the user. After view 201 is preloaded into memory, the input device is checked to see if the user has requested that another view be displayed. If the user has requested that a requested view be displayed, the database system checks to see if the requested view has been loaded into memory (e.g., as the preloaded anticipated view). If the requested view is view 201, it will have been loaded into memory as the anticipated view, so view 201 is retrieved from memory and displayed on the monitor. Since loading the requested view from memory is much faster than loading the requested view from the database, the time required to respond to the user's request for the requested view is shortened dramatically. If the requested view is not in memory, however, it must be retrieved from the database.

Instead of loading the entire anticipated view before checking the input device 24, in other embodiments of the present invention the input device is monitored during the time the anticipated view is being preloaded into the database. If the user requests a requested view, the preloading of the anticipated view stops and the user's request is serviced. This ensures that the system is very responsive to the user's input. Such an embodiment can be implemented by checking the input device each time a segment (i.e., a portion) of the anticipated view is preloaded. If the computer 42 is running multitasking and/or multithreading operating system, such an embodiment can alternatively be carried out using the various techniques appropriate for such an operating system.

Figure 4A:
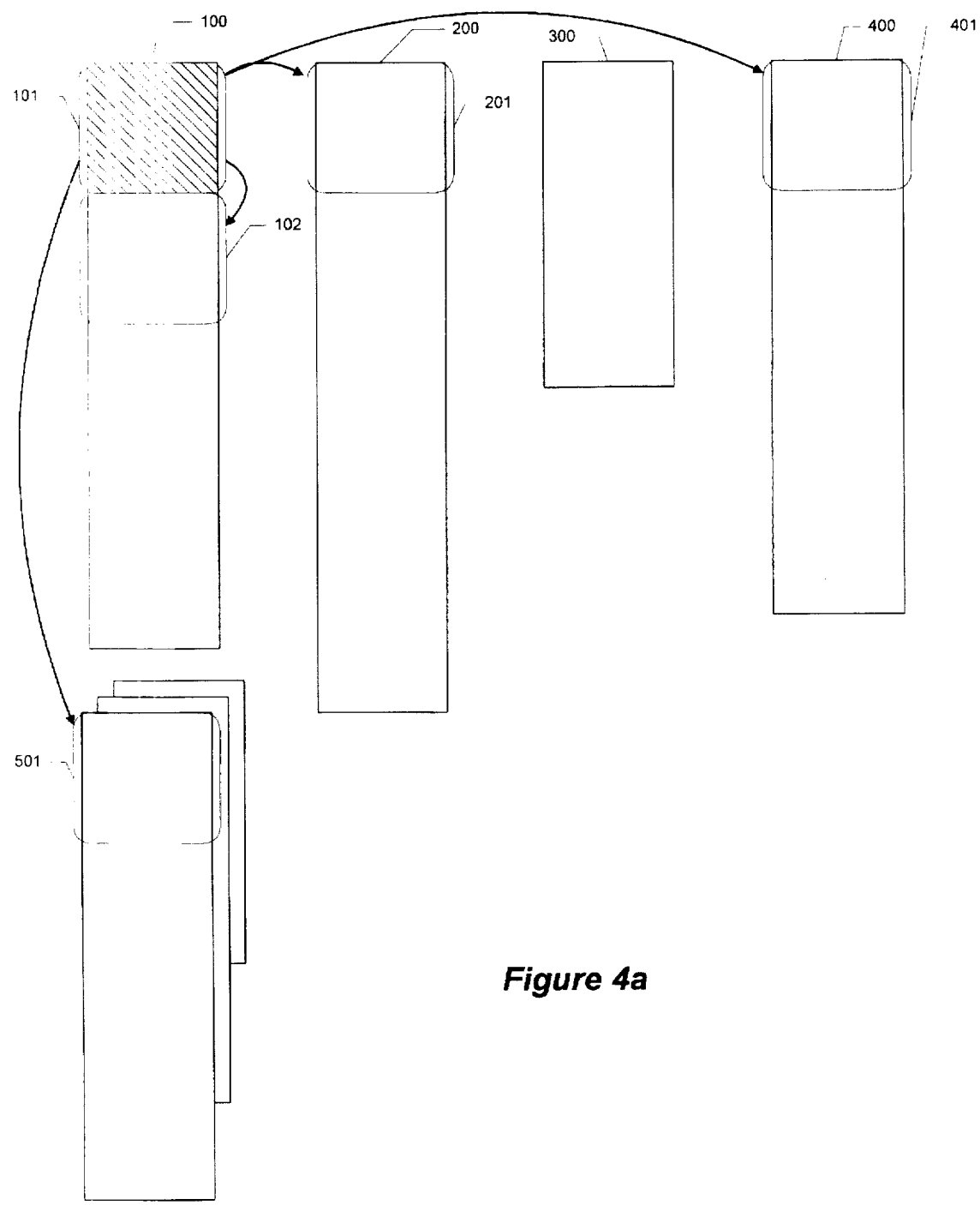
FIGS. 4(a) and 4(b) are each a representation of four search documents and three related documents showing a display view and four anticipated views.

FIG. 4(a) shows a situation where view 101 (shaded) is the display view, and the retrieval system has identified four views 102, 501, 201, and 401 as anticipated views. View 102 is likely to be requested by the user when the display view is view 101 because it is the next view in the document that the user is currently viewing. View 501 is a candidate for the requested view because it is the first view from a document (500) that relates to the search document (100) that the user is currently viewing. View 401 is also an anticipated view because the user might wish to view the document that represents the opposite extreme of the ordering characteristic (e.g., the oldest document). And as described above, view 201 is also likely to be requested by the user.

In the embodiment of FIG. 4(a), the retrieval system will attempt to load as many of these anticipated views as possible while the user is studying the display view 101. If enough time passes before the user requests a requested view, the retrieval system may preload all four of the anticipated views, thereby enhancing the likelihood that the next requested view will be in memory.

Figure 4B:
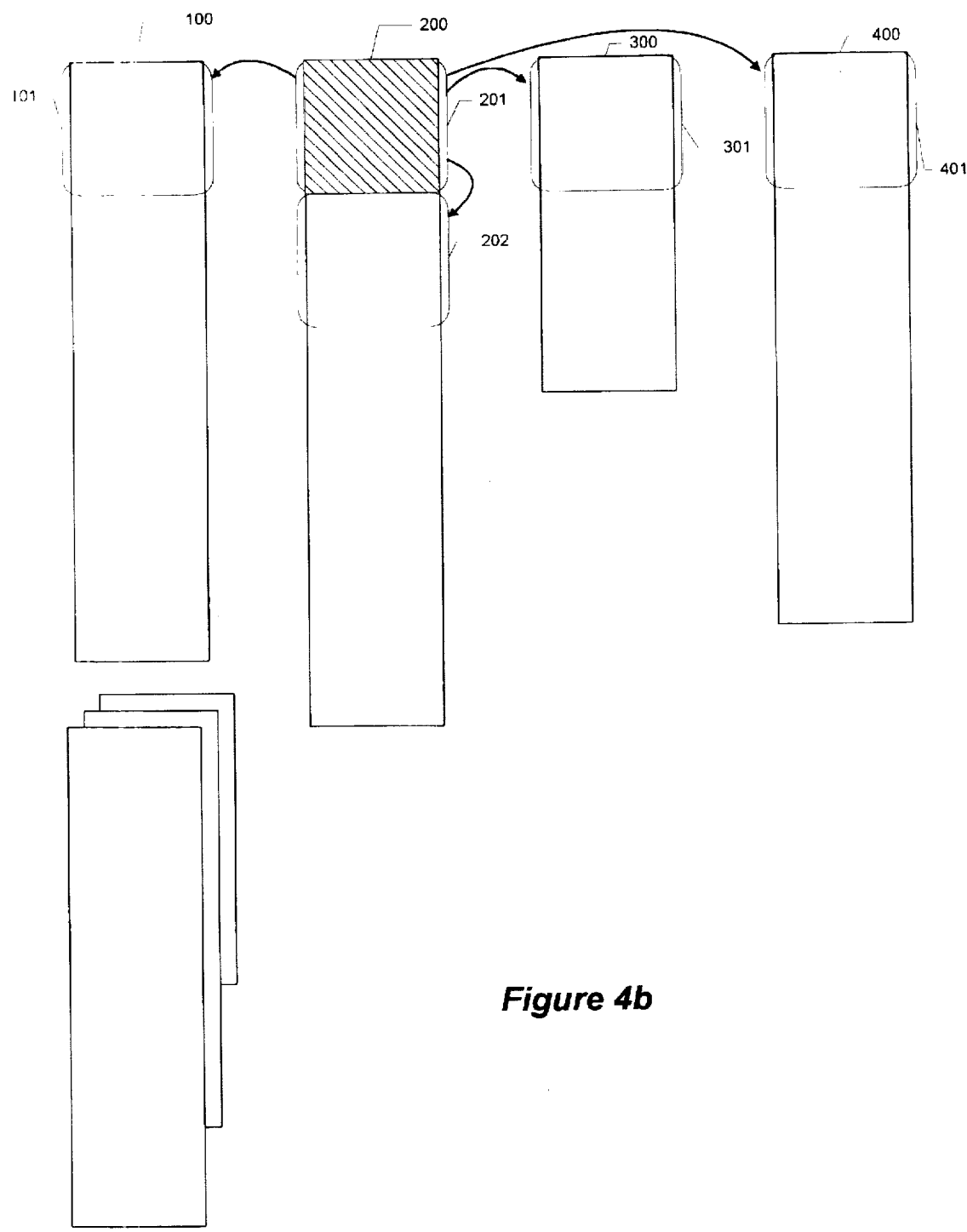

Once the user issues a request for a requested view, the requested view is loaded from memory (or from the database, if necessary) and displayed on the monitor. The process of determining and preloading anticipated views then starts over. For example, if the requested view is view 201, the display view will then become view 201 (shaded)

as shown in FIG. 4(b). The anticipated views would also change, and might be identified as indicated by the arrows.

Figure 5A:
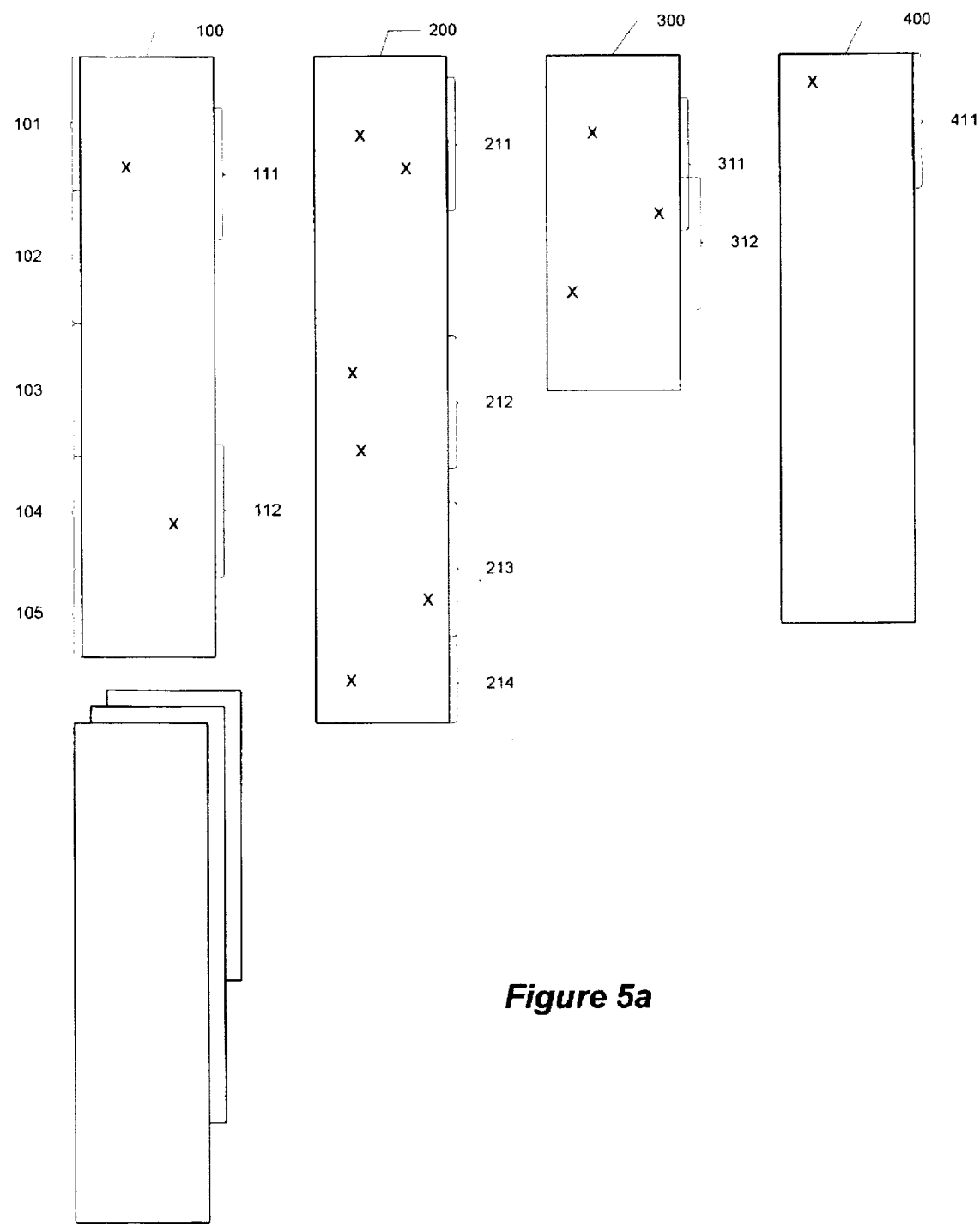
FIGS. 5(a) and 5(b) are each a representation of four search documents and three related documents showing various term views.

FIG. 5(a) shows another representation of four search documents showing term views 111, 112, 211, 212, 213, 214, 311, 312, and 411. In FIG. 5(a), a term view is a view that has at least one search term from the query. And as can be seen from document 100 in FIG. 5(a), the boundaries of these term views may or may not correspond to the boundaries of views 101, 102, 103, and 104. Term views may also be anticipated views because the user might request as a requested view the next view having one or more of the terms in the query. Some systems provide a command for this purpose (e.g., in Westlaw, the command is "t").

Figure 5B:
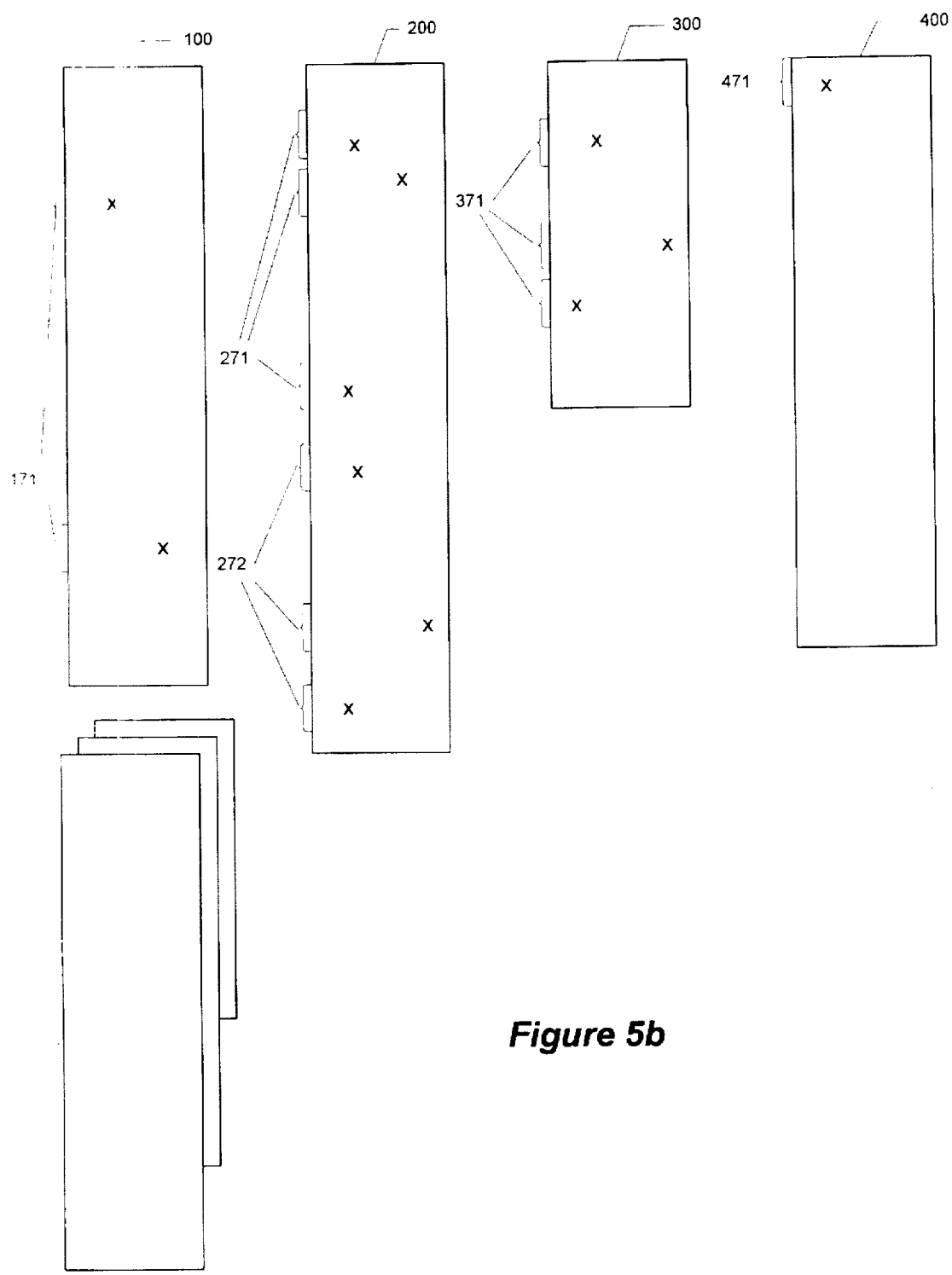

FIG. 5(b) shows the representation of the four search documents showing other term views 171, 271, 272, 371, and 471. These term views are made up of a small number of words surrounding each occurrence of a search term in the search documents. Since the number of words surrounding the search terms is small, more than one set of words can fit on the screen at a given time. Thus, the term view in this embodiment includes information from different parts of the document. The "KWIC" display format in the LEXIS/NEXIS system operates similarly.

Figure 6:
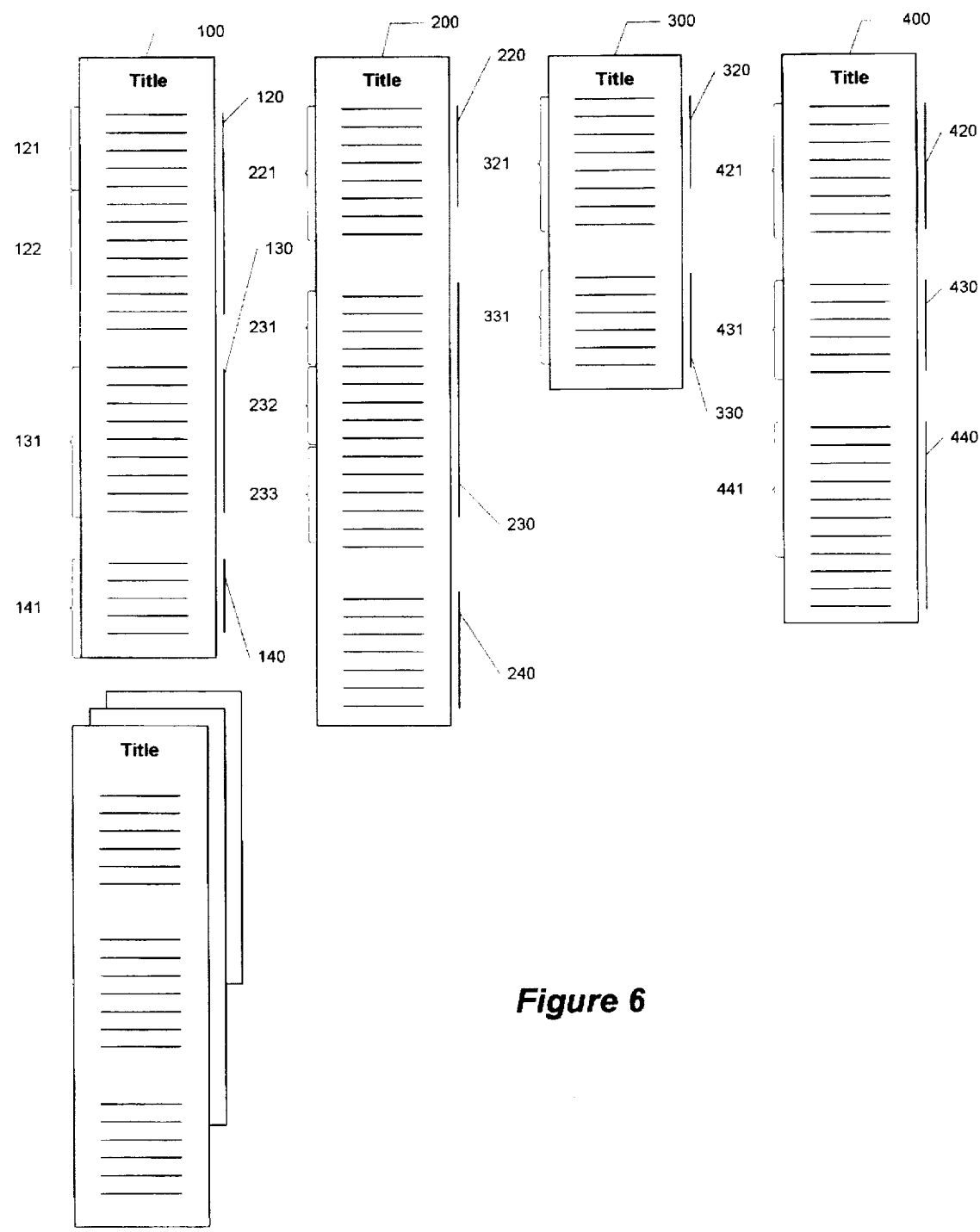
FIG. 6 is a representation of four search documents and three related documents showing various subdocument views.

FIG. 6 shows another representation of the four search documents showing subdocument views 121, 122, 131, 141, 221, 231, 232, 233, 321, 331, 421, 431, and 441. The subdocuments are shown in FIG. 6 as 120, 130, 140, 220, 230, 240, 320, 330, 420, 430 and 440. A subdocument is any logically separable or identifiable portion of a document. For example, if a document is a judicial opinion, there might be subdocuments for the title and citation for the case, for each of the headnotes, for the opinion itself, and for any dissenting opinions. A subdocument view is a view within a subdocument.

Subdocument views may be anticipated views because the user often is particularly interested in a particular portion of the search documents. If the search documents consist of a series of judicial opinions, for example, a user may only wish to view, for each of the search documents, the subdocument for the majority opinion (and not the headnotes, dissenting opinions, etc.). Thus, it may be appropriate for the anticipated views to be drawn primarily from a particular type of subdocument.

In other situations, however, the user may only wish to see the first subdocument view for each subdocument. It would be appropriate in these situations for the anticipated views to be primarily the first views from the various subdocuments within each document.

The retrieval system of the present invention identifies anticipated documents by focussing on the current display view. The current display view gives clues as to which view might be requested by the user because the display view identifies the user's progress in browsing the search documents. In other words, the current display view identifies which search document in the sequence of search documents is currently being viewed. This information is useful because the search document immediately following and preceding the current search document (as defined by the ordering characteristic) is often the search document next requested by the user.

The view displayed just prior to the displayed view might also be a consideration in determining the anticipated views if it tends to show a pattern that can identify the user's next requested view. For example, referring to FIG. 6, if the user requests view 131 of search document 100, and then requests view 231 of search document 200, the retrieval system can consider these two consecutive display views and determine that an appropriate anticipated view is view 331 of search document 300. View 331 is the first view of subdocument 330, which could be of the same type as subdocuments 130 and 230, the two subdocuments previously viewed by the user. Since the goal is to accurately predict the next requested view, considering the views that the user requested in the past may be helpful if it tends to identify the views that the user will request in the future.

In general, any appropriate adaptive prediction scheme can be used that uses the user's history of requested views (and display views) to accurately determine which views are likely to be next requested by the user. It might be appropriate in some cases to consider many display views in determining appropriate anticipated views. Longer histories may tend to identify patterns that would not show up if only a small number of recent display views are considered.

Tendencies can even be monitored over more than one research session in situations where a particular user or group of users tend to request views in a particular pattern each time research is done. In addition, the user could be prompted to indicate the type of research being undertaken, which may give clues as to what type of anticipated views are appropriate for efficient operation. Finally, the particular databases used or type of research being done can be monitored by the database system and advantageously taken into account in determining anticipated views.

In the preferred embodiment of the present invention, the anticipated views are drawn from both related documents and search documents. A fundamental distinction between related documents and search documents is that related documents are statically-related to the search documents, whereas search documents are dynamically-related to one another. This difference is significant because unlike statically-related documents, no predefined link needs to be set up for search documents. A statically-related document is always associated with a particular document, regardless of the query (the related document is therefore statically-related). The search documents, on the other hand, are related to each other by the query. Since the query changes with each search, the search documents are considered dynamically-related to one another.

Some of the recent CD-ROM products have implemented features such as hyperlinked text, and timeline-linked text (clicking on a time-line item will take the user to a relevant article). See The Top 100 CD-ROMs, *PC Magazine*, Sep. 13, 1994, p. 115. Links of this nature are static because they always apply and do not depend on any particular query run by the user.

The search documents are ordered by an ordering characteristic as described previously. Thus, when a "next document" is requested, it is assumed that the search document requested by a "next document" command is the search document that is "next" according to the ordering characteristic. If the search documents are ordered by publication date, for example, the "next document" will be interpreted as a request for the search document with the next oldest publication date.

Figure 7:
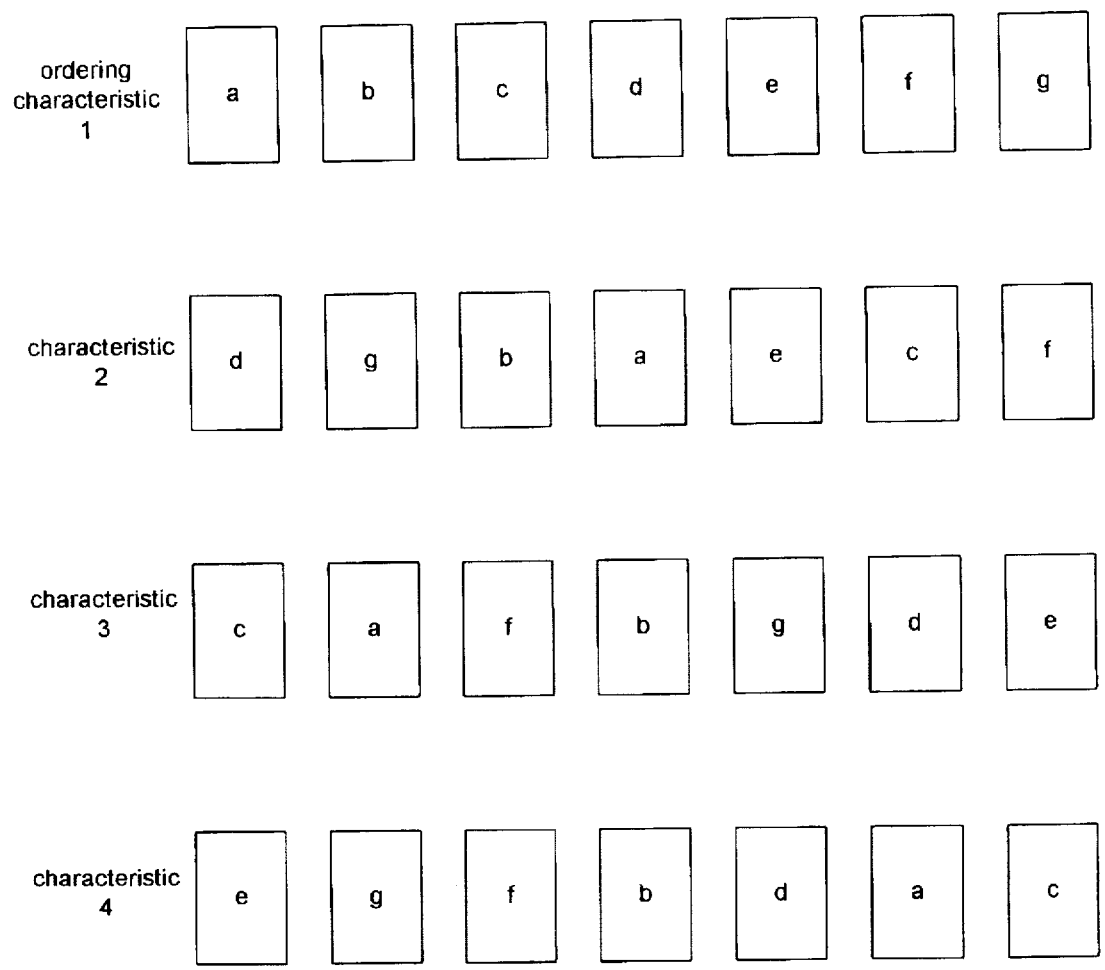
FIG. 7 shows seven documents ordered according to four different ordering characteristics.

In one embodiment of the present invention, it is possible to make a number of different ordering characteristics available for use by the user in browsing the search documents. For example, FIG. 7 shows seven documents labelled "a" through "g" ordered according to four different ordering characteristics. When the display view is in document "a," the "next document" command can be a request for four different documents (i.e., "b," "e," "f," or "c"), depending on the particular ordering characteristic used. More than one ordering characteristic must therefore be considered when determining anticipated views if the user is capable of moving to a "next document" in the context of more than one ordering characteristic. This feature can be enabled by an input device command that allows the user to select the desired ordering characteristic.

The present invention is applicable to single-user, multiple-user, and many-user databases, but the present invention is most effective when used in connection with single-user databases. The efficient operation of the invention depends on being able to retrieve data from the database very frequently, perhaps continually. The present invention is quite effective with single-user databases such as those on CD-ROM or other mass storage devices (this might also include a hard drive implementation). In a single-user database, the no other demands are being made on the database by other users, so the database is often idle.

But since a many-user or multiple-user database must be shared among more than one user, such a database will often be receiving simultaneous and continual requests for data. Databases in such a system are rarely idle, so there is little time to preload anticipated views into memory. In such a situation, the present invention will not be as effective in improving the response time to users' requests for requested views. But in many-user or multiple-user database systems where the database is not as busy, the present invention can be effective in reducing response times to users' requests for information.

Figure 8:
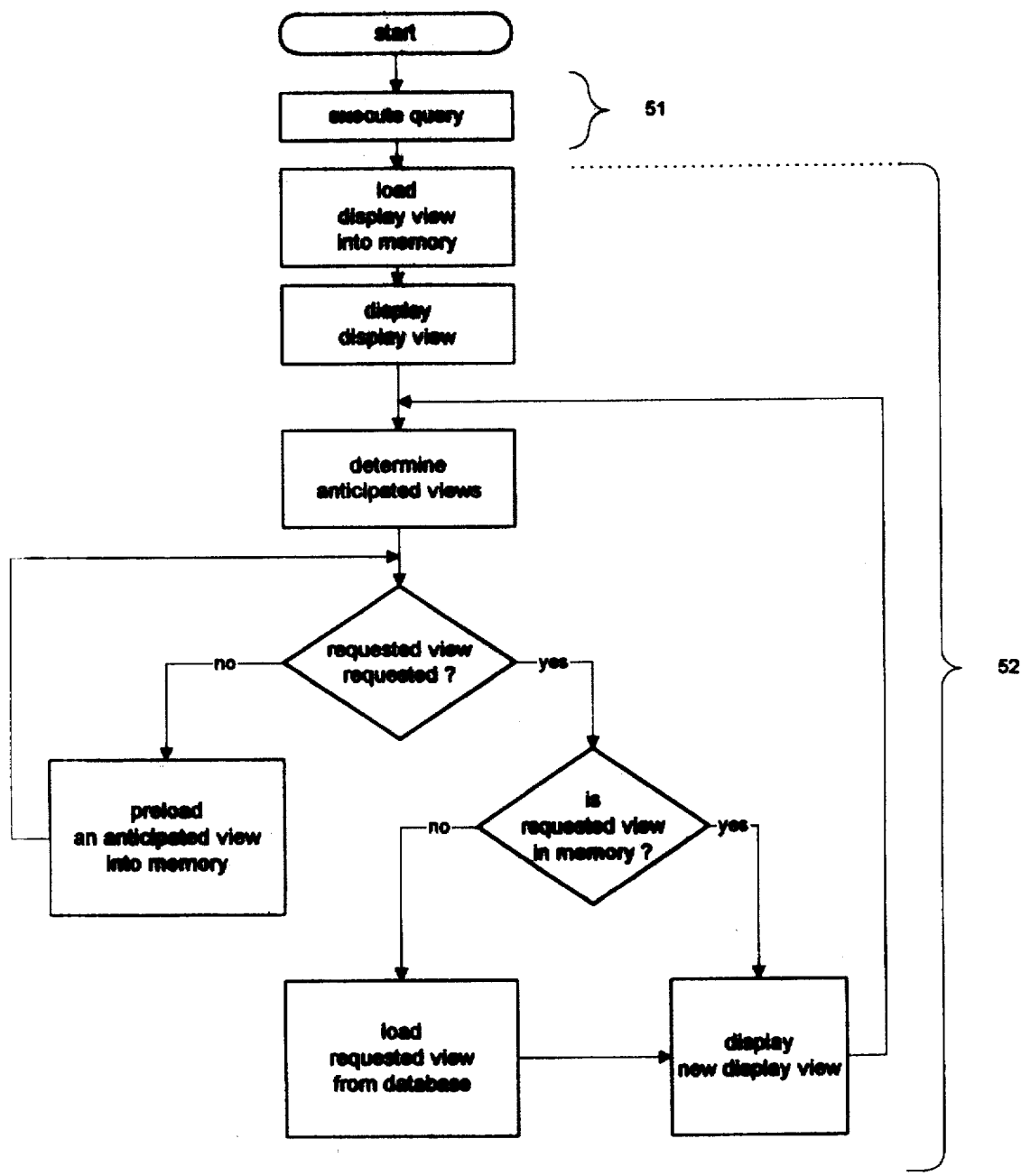
FIG. 8 is a flow chart of the operation of a database system in one embodiment of the present invention.

FIG. 8 is a flow chart of the operation of the database system in one embodiment of the present invention. A system in one embodiment of the present invention begins by executing a query to identify the search documents. This step is carried out by search logic 51. The remaining steps shown in FIG. 8 (described below) are carried out by retrieval logic 52. Both the search logic 51 and the retrieval logic 52 are part of the program logic 33, which is often software. As one skilled in the art will recognize, in a software implementation the search logic 52 and the retrieval logic 52 may or may not be integral or intertwined parts of the same computer program (i.e., program logic 33).

As dictated by the retrieval logic 52, the database system then loads into memory a view from one of the search documents. See FIG. 8. This first display view is then displayed on the monitor. Normally the user will take a few moments to read or study the display view. During this time, one or more anticipated views are identified. The anticipated views are views that the user is likely to request be displayed on the monitor after the display view.

The database system then begins to preload these anticipated views into memory from the database, while also continually monitoring the input device to determine if the user has issued a request to display a different view (i.e., a "requested view") on the monitor. Anticipated views are loaded into memory until the user requests a requested view.

When the user does makes such a request, the database system then determines whether the requested view is in memory. The requested view may be in memory because it could have been preloaded into memory as an anticipated view. If the requested view is in memory, the requested view becomes the new display view, and it is displayed on the monitor. But if the requested view is not in memory, the requested view must first be loaded from the database before it can be displayed on the monitor as the display view.

The anticipated views are a function of the display view because the views that the user is likely to request depend to some degree on the view the user is currently reading. In other words, those views that are anticipated views when view 101 is the display view are not likely to be the same as the anticipated views when view 202 is the display view. Therefore, as shown in FIG. 8, the anticipated views are determined each time the display view changes.

When the display view is changed, the anticipated views for the prior display view can remain in memory so that they are available if they are ever requested by the user. But if memory is limited, the anticipated views for the prior display view can be deleted from memory, preferably in an efficient manner (e.g., anticipated views common to both the new display view and the prior display view are not deleted from memory). It is best to delete those views that are not likely to be requested by the user. It may also be appropriate to consider whether a view is likely to become an anticipated view in the future.

Figure 9:
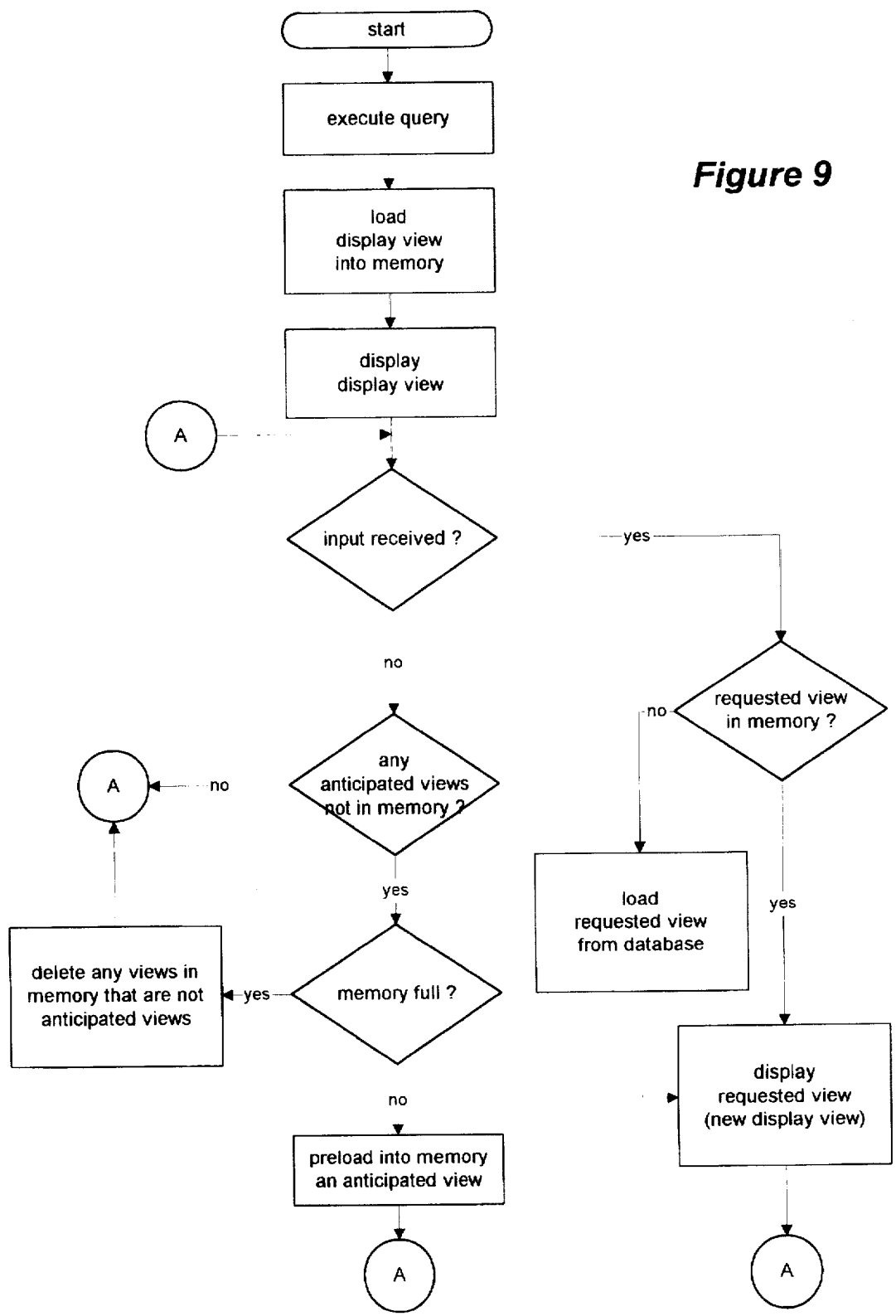
FIG. 9 is a flow chart of the operation of a database system in an alternate embodiment of the present invention.

FIG. 9 shows a flow chart representing another embodiment of the present invention where anticipated views from prior display views are deleted if memory is full. The views deleted are those that are not anticipated views for the new display view. This will presumably make room for new anticipated views to be preloaded into memory (if not all of the anticipated views are already in memory).

The number of anticipated views for a given display view does not have to be a predetermined or constant number, but rather can vary depending on memory available. Typically, the number of anticipated views for a display view is a trade-off between the amount of memory available and the desired speed of retrieval. In instances where memory is plentiful, where the number of search documents is few, and/or where the search documents are small, it may be possible for all of the search documents to be completely loaded into memory. In such a situation, the number of anticipated views for a given display view could be as high as the total number of views in the search documents. At the other end of the spectrum, there might be only one or two anticipated views for each display view if memory is limited.

Embodiments of the present invention can vary as to how anticipated views are preloaded into memory. In the embodiments of FIGS. 8 and 9, one anticipated view at a time is preloaded into memory, and the retrieval system does not begin preloading a second anticipated view into memory until the prior anticipated view is completely preloaded into memory. In other embodiments, anticipated views are simultaneously preloaded.

Simultaneous preloading of multiple anticipated views can be done in a number of ways. In a multitasking operating system, for example, an appropriate time-slicing procedure can be used to preload the anticipated views so that they are preloaded simultaneously. In another embodiment, one segment from each anticipated view is preloaded in turn, and the cycle is repeated until all the anticipated views are fully preloaded into memory (or until the user's request for a requested view interrupts the preloading process). A segment is any portion of an anticipated view, such as one or two lines or even a single byte of the anticipated view.

Figure 10:
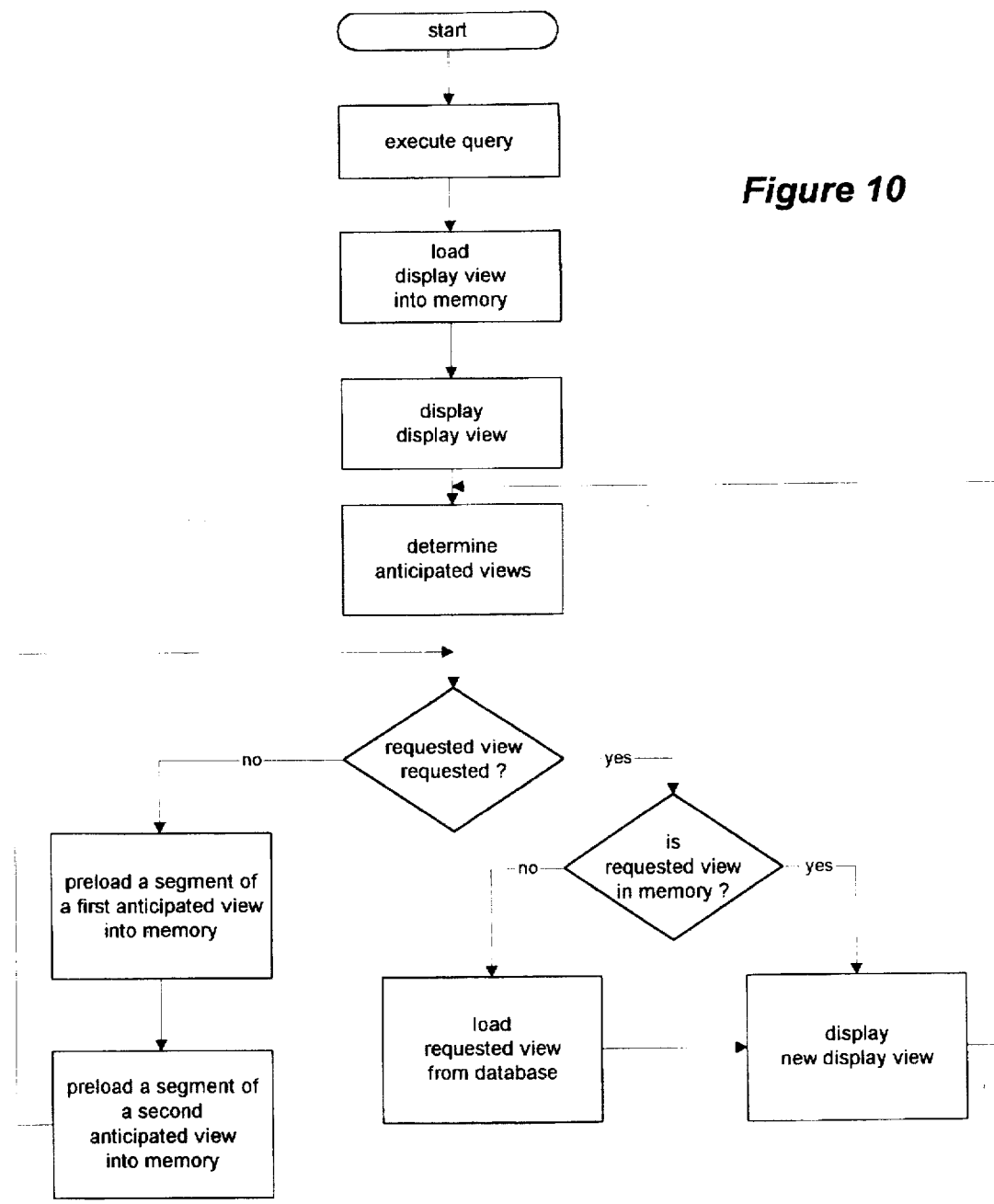
FIG. 10 is a flow chart of the operation of a database system in an alternate embodiment of the present invention.

FIG. 10 shows a simple implementation of the simultaneous preload concept, where the database system preloads a segment of a first anticipated view into memory, and then preloads a segment of a second anticipated view into memory. These steps continue until either the user requests a requested view, or both anticipated views are fully preloaded into memory. When the user requests a requested view, the database system checks to see if that requested view is in memory. If the requested view is only partially preloaded into memory, that portion in memory can be written to the monitor and the remaining portion loaded from the database. The response time in this situation will still be better than if the entire requested view has to be loaded from the database. The present invention has been principally described in the context of accessing the database and identifying search documents through a search term query. The present invention can be applicable in other research-related contexts where search documents are identified using another type of entry path. For example, a time-line can be used for locating information or documents that are associated with a given time or time-frame. Another information access method uses a topic tree that permits a user to choose from successively narrowing topics until the desired topic is located. It is possible for the present invention to be applicable even in other non-research contexts where similar preloading techniques may permit efficient navigation of information and/or short response times. The present invention can also be used in combination with caching systems where previously-displayed views are stored for repeated use.

The present invention has been primarily described in the context of a general purpose computer implementation. As one skilled in the art will recognize, however, it is possible to construct a specialized machine that can carry out the present invention.

Although the present invention has been shown and described with respect to preferred embodiments, various changes and modifications that are obvious to a person skilled in the art to which the invention pertains, even if not shown or specifically described herein, are deemed to lie within the spirit and scope of the invention and the following claims.

What is claimed is:

1. A system for retrieving information comprising:
   (a) a many-user database that is capable of being accessed by more than one user, wherein numerous documents are stored within the database; and
   (b) a computer comprising a memory unit, a monitor for displaying information to a user, an input device, and a connection to the many-user database, and wherein the computer is running a multi-tasking operating system and is programmed to:
   retrieve a first document from the many-user database over the connection to the many-user database, wherein the text of the first document contains a reference to a second document and also a reference to a third document, wherein the text of the second document contains a reference to a fourth document, and wherein all four documents include textual information,
   display the first document on the monitor,
   preload in the background at least a portion of the second document into the memory unit while the user is viewing the first document, and before the second document is requested by the user through the input device,
   preload in the background at least a portion of the third document into the memory unit while the user is viewing the first document, and before the third document is requested by the user through the input device,
   display the second document when the second document is requested by the user through the input device, wherein the second document is displayed by retrieving the second document from the memory unit, and by retrieving from the database any portion of the second document not preloaded into the memory unit,
   delete from the memory unit the portion of the third document stored in the memory unit,
   preload in the background at least a portion of the fourth document into the memory unit while the user is viewing the second document, and before the fourth document is requested by the user through the input device, and
   display the fourth document when the fourth document is requested by the user through the input device, wherein the fourth document is displayed by retrieving the fourth document from the memory unit, and by retrieving from the database any portion of the fourth document not preloaded into the memory unit.

2. The system of claim 1, wherein the preloading of the third document is stopped when the second document is requested by the user through the input device, and at that time the user's request for the second document is serviced.

3. The system of claim 1, wherein the connection to the many-user database is a low-bandwidth connection.

4. The system of claim 3, wherein the low bandwidth connection is a telephone line.

* * * * *